United States Patent [19]

Fukushima et al.

[11] Patent Number: 5,138,599
[45] Date of Patent: Aug. 11, 1992

[54] INFORMATION RECORDING MEDIUM HAVING DUMMY TRACKS AND INFORMATION RECORDING AND REPRODUCING APPARATUS

[75] Inventors: Yoshihisa Fukushima, Osaka; Isao Satoh; Yasushi Azumatani, both of Neyagawa, all of Japan

[73] Assignee: Matsushita Electric Industrial Co., Ltd., Osaka, Japan

[21] Appl. No.: 438,003

[22] Filed: Nov. 20, 1989

[30] Foreign Application Priority Data

Nov. 21, 1988 [JP] Japan ............................ 63-293855
Jun. 15, 1989 [JP] Japan ............................ 1-153376
Jun. 15, 1989 [JP] Japan ............................ 1-153378

[51] Int. Cl.⁵ .......................... G11B 3/90; G11B 3/70; G11B 7/00
[52] U.S. Cl. .......................... 369/54; 369/32; 369/275.3; 369/58
[58] Field of Search .......... 369/32, 44.33, 43, 58, 369/54, 275.3, 44.26, 275.1, 44.28, 44.29, 44.31

[56] References Cited

U.S. PATENT DOCUMENTS 4,519,056  5/1985  Kimoto et al. ............... 369/32
4,884,259  11/1989  Horikawa et al. ............ 369/44.26

FOREIGN PATENT DOCUMENTS 3604916  8/1986  Fed. Rep. of Germany .
61-210564  9/1986  Japan .

OTHER PUBLICATIONS

JP-63-152598, published 1988 Classified in class 369/275.3 (Abstract only).

*Primary Examiner*—Roy N. Envall, Jr.
*Assistant Examiner*—Nabil Hindi
*Attorney, Agent, or Firm*—Wenderoth, Lind & Ponack

[57] ABSTRACT

In a disk-shaped information recording medium using an MCAV format, a plurality of tracks are divided in a radial direction of the disk to form plural zones, at the boundary of which a dummy track area is formed by dummy tracks on which a discrimination signal is recorded. By this provision, the erroneous data recording and reproducing operation in the tracks positioned at both ends of the zone due to crosstalk is prevented. In an information recording and reproducing apparatus, by providing a circuit for correcting the seek distance based on the number of the dummy tracks located between a current track and a target track, correct seek operation is executed. Also, by providing a detector for detecting the discrimination signal and a mechanism to move the head on the dummy track into the zone, erroneous recording and reproducing operation of the data in the dummy track is prevented. Further, by providing a circuit to determine if a write clock to be used for data recording has a prescribed frequency precision, assurance is made to have the frequency precision in coordination with the data recording density in which the write clocks are different between the zones so as to improve reliability of the recorded data.

13 Claims, 11 Drawing Sheets

INFORMATION RECORDING MEDIUM HAVING DUMMY TRACKS AND INFORMATION RECORDING AND REPRODUCING APPARATUS

BACKGROUND OF THE INVENTION

1. Field of the Invention

The present invention relates to a disk-shaped information recording medium for recording and reproducing information on a sector by sector basis and an information recording and reproducing apparatus using said information recording medium.

2. Description of the Prior Art

In a disk-shaped information recording medium having a large number of concentrically or spirally formed tracks, and having a disk format in which these tracks are divided into plural zones in the radial direction of disk, the same number of sectors are formed in each track in the zone, and the number of sectors formed per track increases as the zone goes from the inner periphery to the outer periphery. Such a format is called an MCAV (Modified Constant Angular Velocity) format.

FIG. 12 shows a schematic view of conventional information recording medium having an MCAV format. In the information recording medium, the data recording area in which the user can make recording is divided into plural zones. In FIG. 12, only the adjacent two zones are illustrated. While each track in the zone (i) is divided into (n+1) sectors, each track in the zone (i+1) is divided into n sectors. FIG. 13 is a track construction view in the boundary area between the zone (i) and the zone (i+1) in the disk having such an MCAV format. In FIG. 13, the track (i) is a track positioned at the innermost periphery in the zone (i), and the track (i+1) is a track positioned at the outermost periphery in the zone (i+1). And, while the track (j) is divided into n+1 sectors, the track (j+1) is divided into n sectors. Each sector is composed of an ID field in which address information is recorded and data field in which the user data are recorded.

However, in a disk of such an MCAV format, in the track positioned at the boundary of each zone, the position of ID field of the sector other than the sector $S_0$ differs from that of the adjacent track. Accordingly, when the recording and reproducing head is positioned at the data field of the sector in which no data is recorded in these boundery tracks, address information may reproduced from the ID field on the adjacent track due to crosstalk. For example, notwithstanding the fact that the recording and reproducing head is passing in the data field of the sector $S_1$ which exists on the track (j+1) in which no data is recorded, at the rear end of the data field, erroneous address information may be reproduced by the crosstalk from the ID field of the sector $S_2$ in the adjacent track (j).

When such a situation occurs, data recording and reproducing operation is activated on the basis of the erroneously reproduced address information from the adjacent track, so that there is a problem that the normal data recording and reproducing operation cannot be executed.

SUMMARY OF THE INVENTION

The present invention has its objects to provide an MCAV format information recording medium characterized by making it possible to perform normal data recording and reproducing operation in a track positioned at the boundery of each zone and an information recording and reproducing apparatus characterized by using said information recording medium.

In order to attain the above objects, the information recording medium of the present invention is, in an information recording medium having a plurality of concentric or spiral tracks which are divided into plural zones in the radial direction of the disk, with the same number of sectors being formed in each track in the zone, having a disk format such that the number of the sectors to be formed in the track increases as the zone goes from the inner periphery to the outer periphery, and designed to make recording and reproducing data on a sector by sector basis, characterized by forming a dummy track area composed of at least one dummy track on which a discrimination signal for identifying it to be a dummy track is recorded on a boundary between the zones.

In the present invention, because of the above-mentioned construction, in the tracks positioned at both ends of the zone, no erroneous address information is reproduced by crosstalk from the ID field in the adjacent zones separated by the dummy track area, by which the erroneous data recording and reproducing operation is prevented. Also, on the dummy track, by detecting the discrimination signal for identifying it to be a dummy track, the erroneous data recording and reproducing operation is prevented.

An embodiment of an information recording and reproducing apparatus according to the present invention performs recording and reproducing of data by using a disk-shaped information recording medium in which a plurality of concentric or spiral tracks formed on the disk are divided into plural zones in the radial direction of the disk, and in each zone, each track has the same number of sectors and the number of sectors per track increases as the zone goes from the inner periphery to the outer periphery, and a dummy track area composed of at least one dummy track is formed on a boundary between the zones. Said apparatus is characterized by comprising a seek distance calculating means for correcting the number of tracks over which a head crosses based on the number of dummy tracks located between a current track and a target track to set a physical seek distance, a head seeking means for moving the head to correspond to the physical seek distance, a seek distance counting means for counting the number of tracks over which the head has actually crossed, and a coincidence detecting means for detecting a coincidence between a counting result by the seek distance counting means and a target seek distance set by the seek distance calculating means, wherein the head seeking means is stopped by the output of the coincidence detecting means.

According to the present invention, by the above-mentioned construction, by seeking the target track by calculating a physical seek distance corrected on the basis of the number of the dummy tracks located between the current track and the target track, it becomes possible to execute the seek operation accurately in the disk of an MCAV format in which dummy track is formed.

Another embodiment of an information recording and reproducing apparatus of the present invention performs recording and reproducing of data by using a disk-shaped information recording medium in which a plurality of concentric or spiral tracks formed on the disk are divided into plural zones in the radial direction of the disk, and in each zone, each track has the same number of sectors and the number of the sectors per track increases as the zone goes toward the outer periphery, and a dummy track area composed of at least one dummy track on which a discrimination signal is recorded is formed on a boundary between the zones. Said apparatus is characterized by comprising a discrimination signal detecting means for detecting the discrimination signal reproduced from the dummy track, and a head moving means for moving a head located on the dummy track to the inside of the zone in response to an output of the discrimination signal detecting means.

According to the present invention, by the above-mentioned construction, when the head is positioned on the dummy track, by detecting the discrimination signal reproduced from the dummy track and moving the head outside the dummy track area, it becomes possible to prevent erroneous data recording and reproduction in the dummy track.

A further embodiment of an information recording and reproducing apparatus of the present invention performs recording and reproducing of data by using a disk-shaped information recording medium in which a plurality of concentric or spiral tracks formed on the disk are divided into plural zones in the radial direction of the disk, and in each zone, each track has the same number of sectors and the number of the sectors per track increases as the zone goes toward the outer periphery. Said apparatus is characterized by comprising a write clock generating means for generating a write clock a write clock inspection means for inspecting the frequency of the write clock, and a data recording means for modulating data by using the write clock, wherein the write clock inspection means starts the data recording means only when the frequency of the write clock is in an allowable frequency precision in a zone for recording data.

According to the present invention, by the above-mentioned construction, by inspecting the write clock to be used that the data recording and guaranteeing for the write clock has the frequency precision corresponding to the different data recording densities between the zones it becomes possible to improve the reliability of the recorded data.

DESCRIPTION OF THE PREFERRED EMBODIMENT

Figure 1:
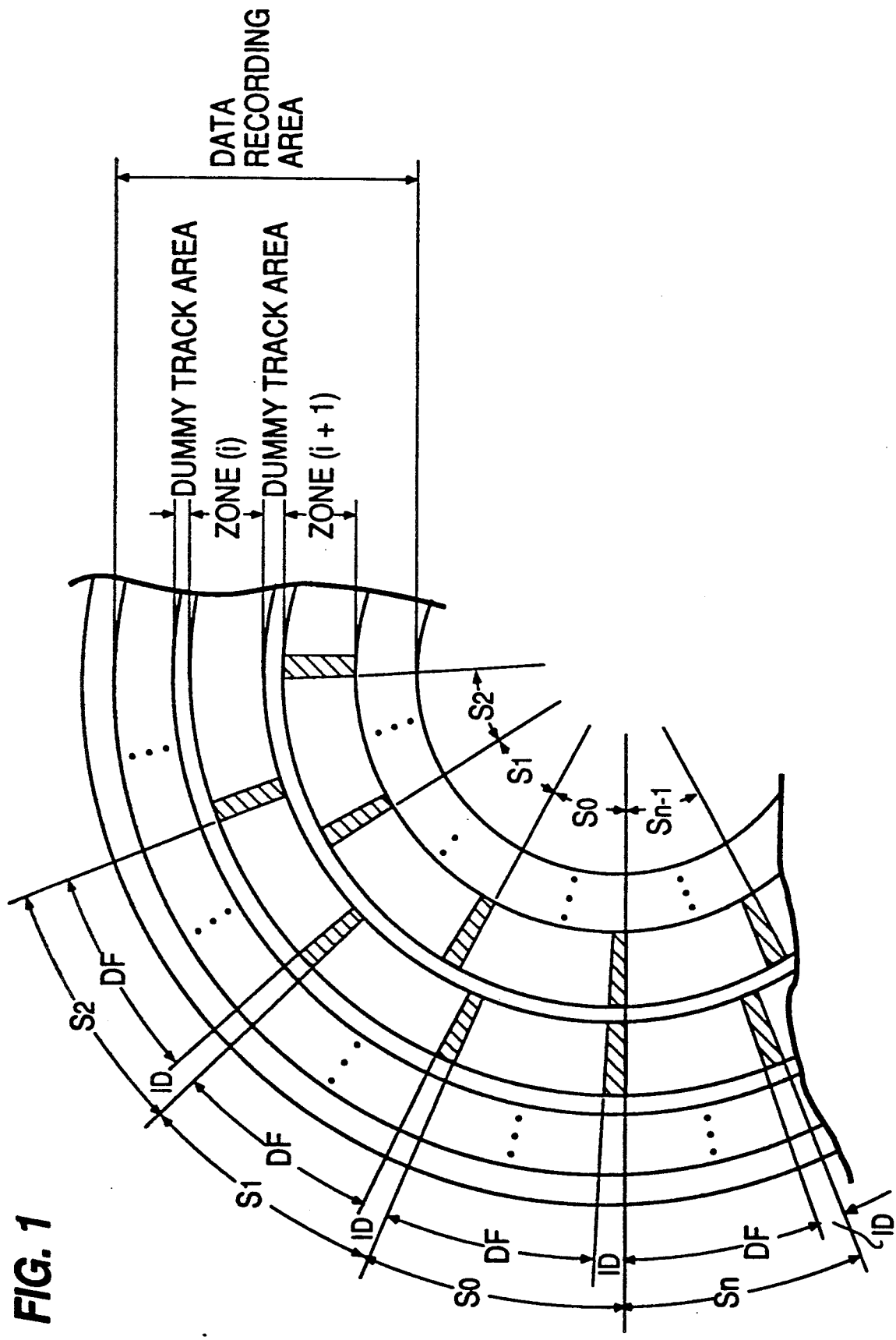
FIG. 1 is a schematic view of an information recording medium in accordance with one embodiment of the present invention.

FIG. 1 is a schematic view of an information recording medium according to the present invention. In the data recording area in which data is recorded and reproduced, there are tracks which are divided into plural zones, and between the zones a dummy track area constructed by at least one dummy track is allocated. In FIG. 1 there are illustrated only a zone (i), a zone (i+1), and a dummy track area existing between these zones. All tracks in the zone (i) are divided into (n+1) sectors from sector $S_0$ to sector $S_n$. On the other hand, all tracks included in the zone (i+1) which is adjacent to the zone (i) on the inner peripheral side are divided into n sectors from sector $S_0$ to sector $S_{n-1}$.

Figure 2:
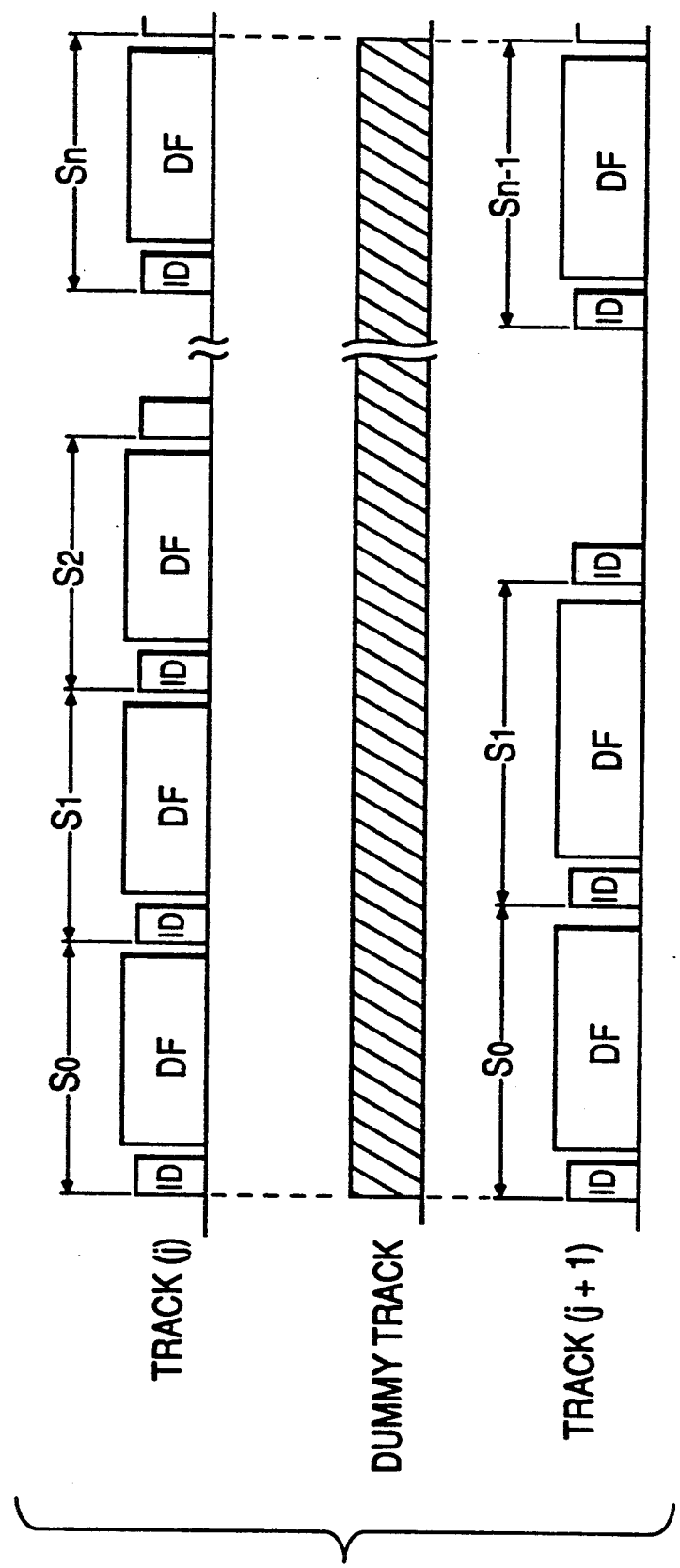
FIG. 2 is a track construction view of a first embodiment relating to the dummy track area.

FIG. 2 is a track construction view of a first embodiment relating to the dummy track area. In FIG. 2, assuming that the dummy track area is constructed by only one dummy track, the structure of each track covering the track (j) positioned at the innermost periphery of the zone (i) to the zone (j+1) positioned at the outermost periphery of the zone (i+1) in FIG. 1 has been briefly described. In FIG. 2, each sector of track (j) and track (j+1) is constructed by an ID field (identification field) in which the address information is recorded and a data field (DF) in which the user data is recorded. Also, in the dummy track formed between track (j) and track (j+1), a discrimination signal for identifying it to be a dummy track is recorded in the whole area of track (the area shown by hotched lines in the drawing) in place of the address signal and the data signal. By the formation of such a dummy track between the zone (i) and the zone (i+1), when the head exists on the track (j), even if the discrimination signal is detected due to crosstalk, erroneous reproduction of the address information recorded on the ID field of the track (j+1) does not occur. Furthermore, when the head exists on the track (j+1), even if the discrimination signal is detected due to crosstalk, erroneous reproduction of the address information recorded on the ID field of the track (j) does not occur. Accordingly, in the tracks positioned at both ends of each zone, reproduction of erroneous address information due to crosstalk from the ID field in the adjacent zones separated by the dummy track so as to cause the start of the data recording and reproduction operation is prevented.

Figure 3:
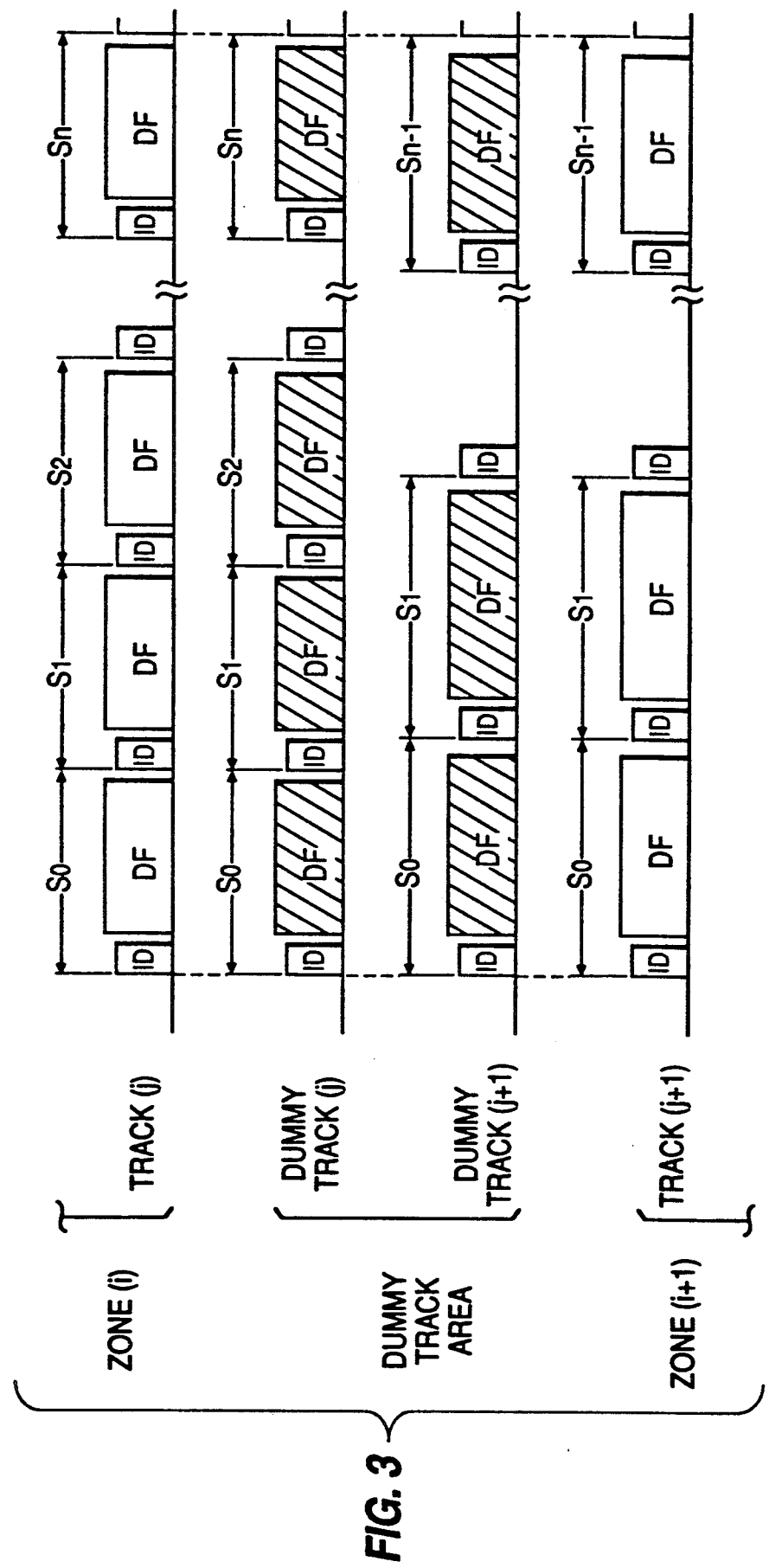
FIG. 3 is a track construction view of a second embodiment relating to the dummy track area.

FIG. 3 is a track construction view of a second embodiment relating to the dummy track area. In FIG. 3, assuming that the dummy track area is constructed by two dummy tracks, the structure of each track covering the track (j) positioned at the innermost periphery of the zone (i) to the track (j+1) positioned at the outermost periphery of the zone (i+1) in FIG. 1 has been briefly described. In FIG. 3, the track (j) and the dummy track (j) adjacent thereto are divided into (n+1) sectors from sector $S_0$ to Sector $S_n$ according to the same track format, and the track (j+1) and the dummy track (j+1) adjacent thereto are divided into (n+1) sectors from sector $S_0$ to sector $S_{n-1}$. In the ID field of each sector, there is recorded an address information along with an address flag for identifying to be a dummy track or not to be a dummy track, by which it becomes possible to determine if a track is a dummy track notwithstanding the fact that the track (j) and the dummy track (j) adjacent thereto have the same track address. With respect to the track (j+1) and the dummy track (j+1) which is adjacent thereto, discrimination is made by the address flag recorded on the ID field of each sector. Further, on the dummy track, in the data field (the botched line area in the drawing) of each sector, a discrimination signal for identifying it to be the dummy track is recorded in place of the user data.

As described above, by the formation of a dummy track area comprising two dummy tracks between the zone (i) and the zone (i+1), when the head exists on the track (j), erroneous reproduction of the address information recorded on the ID field of the track (j+1) due to crosstalk does not occur. Furthermore, even when the head exists on the track (j+1), erroneous reproduction of the address information recorded on the ID field of the track (j) due to crosstalk does not occur. Accordingly, in the tracks positioned at both ends of each zone, reproduction of erroneous address information due to crosstalk from the ID field in the adjacent zones separated by the dummy track area to cause the start of the data recording and reproduction operation is prevented.

Next, explanation is given on the properties of the discrimination signal to be recorded on the dummy track. When there is used as a discrimination signal a signal which is different in frequency band from the address signal to be recorded on the ID field or the data signal to be recorded on the data field, it is possible to discriminate the discrimination signal from the address signal or the data signal by using a filter. Furthermore, when the frequency band of the discrimination signal is limited, a unique signal pattern not included in the modulation rule for the address signal and data signal may be used as a discrimination signal to distinguish the discrimination signal from the binarized reproduced signal by the use of a digital comparator. When the address signal and the data signal are modulated by the use of, for example, (2-7) RLLC (Run Length Limited Code), "0"s in the number of between 2 and 7 are to continue between "1" and "1" in the modulated signal pattern. Accordingly, if the following signal pattern is recorded as an example of the discrimination signal, it becomes possible to discriminate readily such a signal from the address signal and the data signal.

"1 0 1 0 1 0 1 0 1 0 1 0 1 0 1 0 ... 1 0 1"

In the foregoing explanation, for simplifying the explanation, it was assumed that the dummy track area was constituted by one dummy track in FIG. 2 and by two dummy tracks in FIG. 3, respectively. However, even if a dummy track area having a larger number of dummy tracks is formed, it is apparent that the similar effect is realized.

Figure 4:
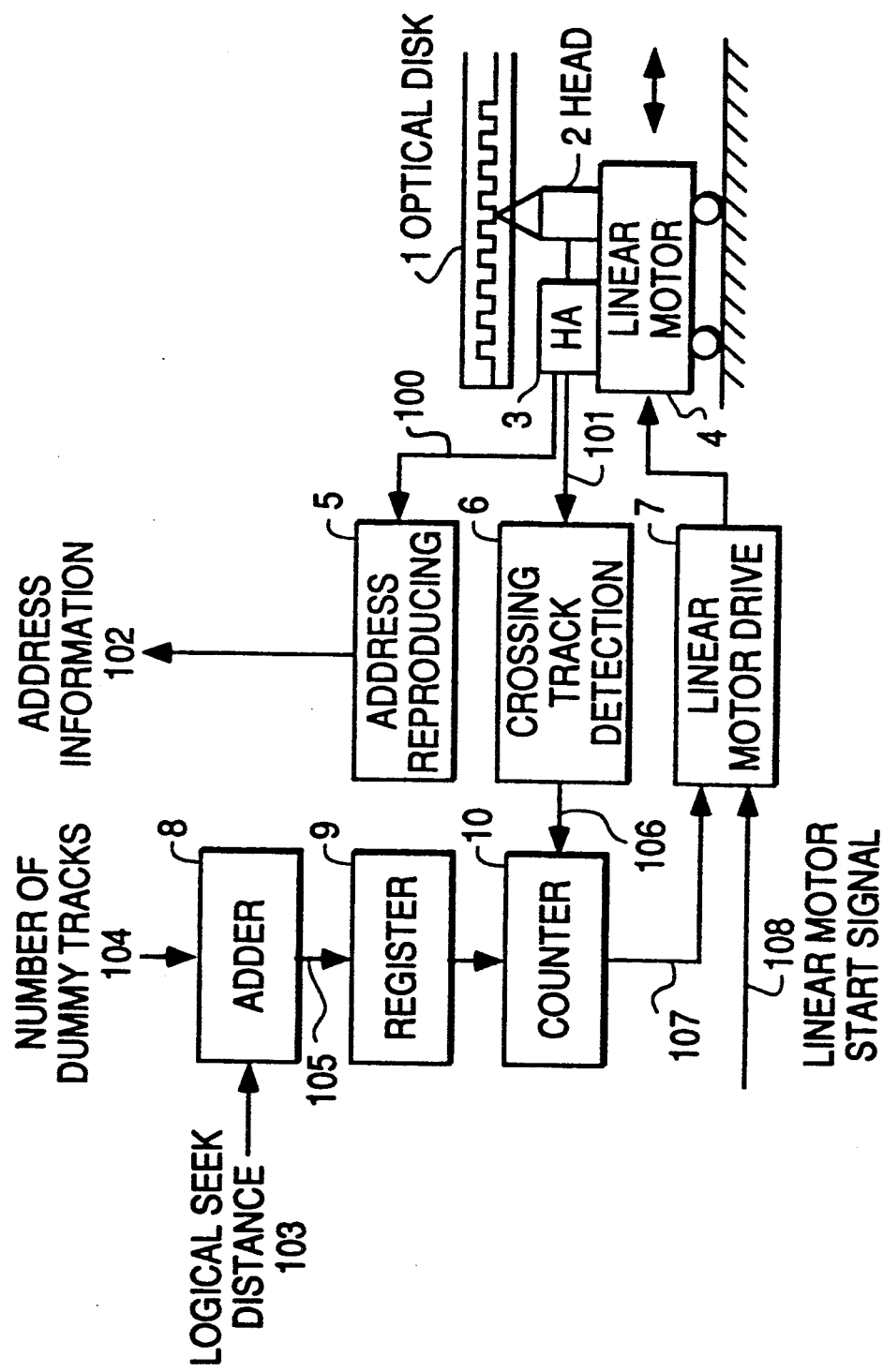
FIG. 4 is a block diagram of a seek operation control section in an information recording and reproducing apparatus in accordance with one embodiment of the present invention.

Next, construction and operation of the information recording and reproducing apparatus of the present invention are explained below. Firstly, a explanation is given on the seek operation using an information recording medium in which a dummy track is formed between the zones. FIG. 4 is a block diagram showing an example of construction of a seek operation control section in the information recording and reproducing apparatus of the present invention. In FIG. 4, element 1 is an optical disk which is an information recording medium using an MCAV format element 2 is a head for recording signals by converging a laser beam on the track of the optical disk 1 or for detecting a signal from the optical disk 1 element 3 is a head amplifier for amplifying the signal from the head 2 to produce a reproduced signal 100 or a tracking error signal 101 element 4 is a linear motor for transporting the head 2 and the head amplifier 3 to a prescribed track element 5 is an address reproducing circuit for discriminating and demodulating the address signal which is included in the reproduced signal 100 and for detected from ID field of each sector to produce address information 102 element 6 is a crossing track detection circuit for counting the number of tracks over which the head crossed based on the tracking error signal 101 element 7 is a linear motor drive circuit for driving the linear motor element 8 is an adder for adding a logical seek distance 103 given from a difference between a current track address and a target track address to which the head is newly transported to the number of dummy tracks 104 which shows the number of the dummy tracks located between the current track and the target track to calculate a physical seek distance 105 element 9 is a register on which the physical seek distance 105 calculated by the adder 8 is set, and element 10 is a counter for counting a crossing pulse signal 106 which is sent out from the crossing track detection circuit 6 and for outputting a linear motor stop signal 107 when the total number thereof coincides with the physical seek distance 105 set on the register 9.

The operations of the seek operation control section of this embodiment constructed as above are explained below.

In the seek operation, firstly, in order to know the address of the current track on which the head 2 is positioned on the optical disk 1, address information 102 sent out from the address reproducing circuit 5 is read. Next, from the difference between the current track address and the target track address, the logical seek distance 103 is calculated and set on the adder 8. On the other hand, based on the control information relating to the MCAV format of the optical disk 1, the number of the dummy tracks located between the current track and the target track is calculated, which is added to the content of the adder 8 as the number of dummy tracks 104 to obtain the physical seek distance 105, which is stored in the register 9.

When the physical seek distance 105 is calculated, by sending out a linear motor start signal 108 to the linear motor drive circuit 7, the linear motor 4 transports the head 2 toward the target track. When the light beam emitted from the head 2 crosses the guide track of the optical disk 1, a track crossing pulse is generated and sent out as a tracking error signal 101. The crossing track detection circuit 6 effects waveform shaping of the track cross pulse included in the tracking error signal 101 and inputs it to the counter 10.

The counter 10 subtracts the number of the received track cross pulses from the amount of the physical seek distance 105 set on the register 9, and, when the content of the counter 10 become zero, it sends out the linear motor stop signal 107 to the linear motor drive circuit 7 and stops the transportation of the linear motor 4.

Finally, the address information 102 is read out to confirm whether or not the head 2 is on the target track or not. If the head 2 is on the target track, the jumping seek operation is executed by moving the actuator (not illustrated) of the head 2 to transfer the head 2 to the target track.

As described above, according to this embodiment, by providing an adder for correcting the seek distance so as to add the number of dummy tracks located betwen the current track and the target track to the logical seek distance to get the physical seek distance which is the real number of tracks over which the head crosses, it is possible to suppress the seek operation error and execute a high speed seek operation.

Figure 5:
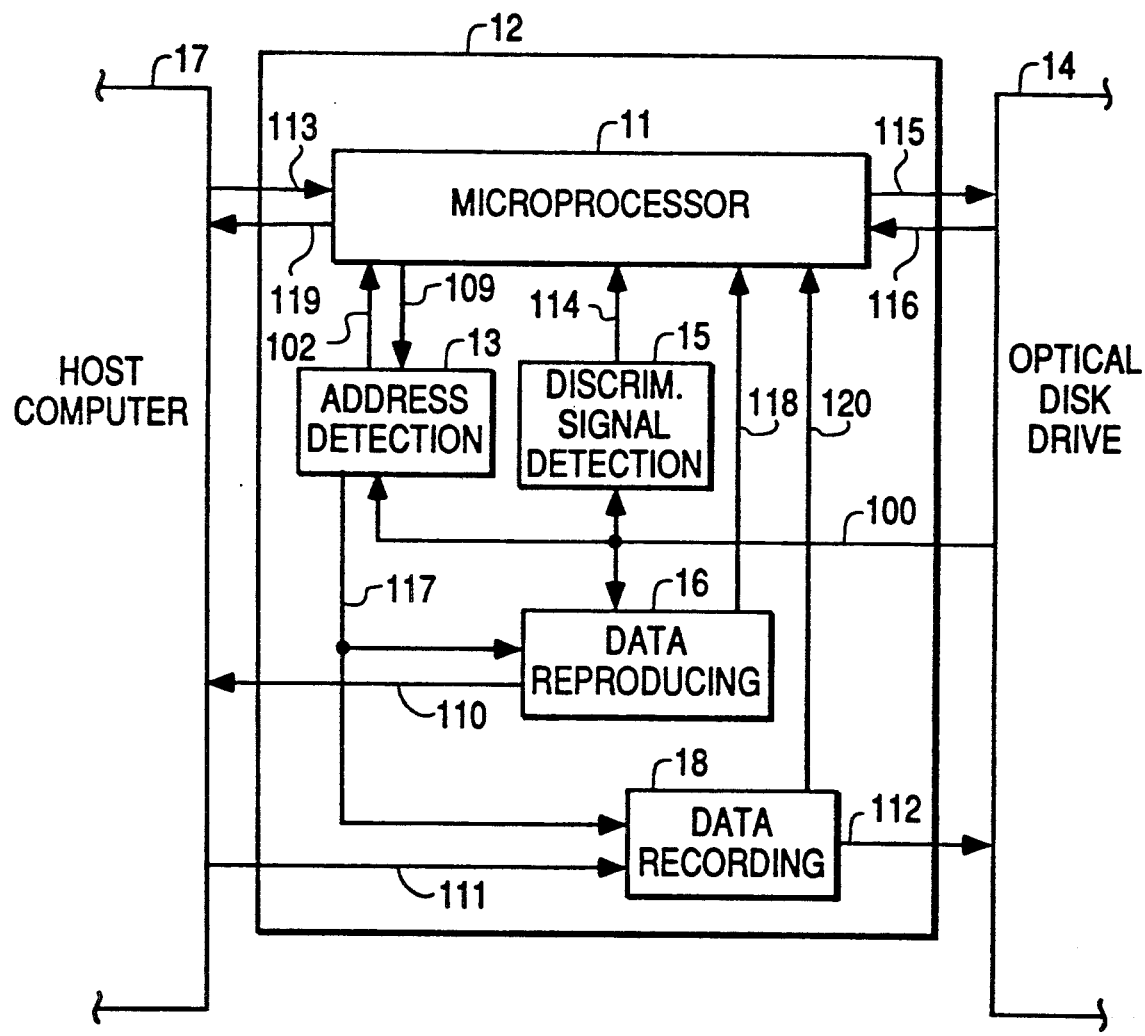
FIG. 5 is a block diagram of a drive control section in the information recording and reproducing apparatus in accordance with one embodiment of the present invention.

Next, explanation is given on the data recording and reproducing operation using the information recording medium on which a dummy track having recorded therein the discrimination signal is formed. FIG. 5 is a block diagrm showing one example of construction of a drive control section in the information recording and reproducing apparatus of the present invention. In FIG. 5, element 11 is a microprocessor used to control the whole drive control section 12 according to the control program stored inside thereof; element 13 is an address detection circuit for reproducing the address information 102 by discriminating and demodulating the address signal recorded on ID field from the reproduced signal 100 sent out from the optical disk drive unit 14 and for detecting a coincidence between the target sector address set by the microprocessor 1 and the read out address information 102; element 15 is a discrimination signal detection circuit for detecting the discrimination signal recorded on the dummy track from the reproduction signal 100; element 16 is a data reproducing circuit for discriminating and demodulating the data signal recorded on data field from the reproduced signal 100, followed by executing error correction procedure and sending out the reproduced information 110 to the host computer 17; element 18 is a data recording circuit for receiving the recording information 111 sent out from the host computer 17 and adding an error detection and correction code, followed by modulating and recording recording signal 112 on the data field of the target sector.

Figure 6:
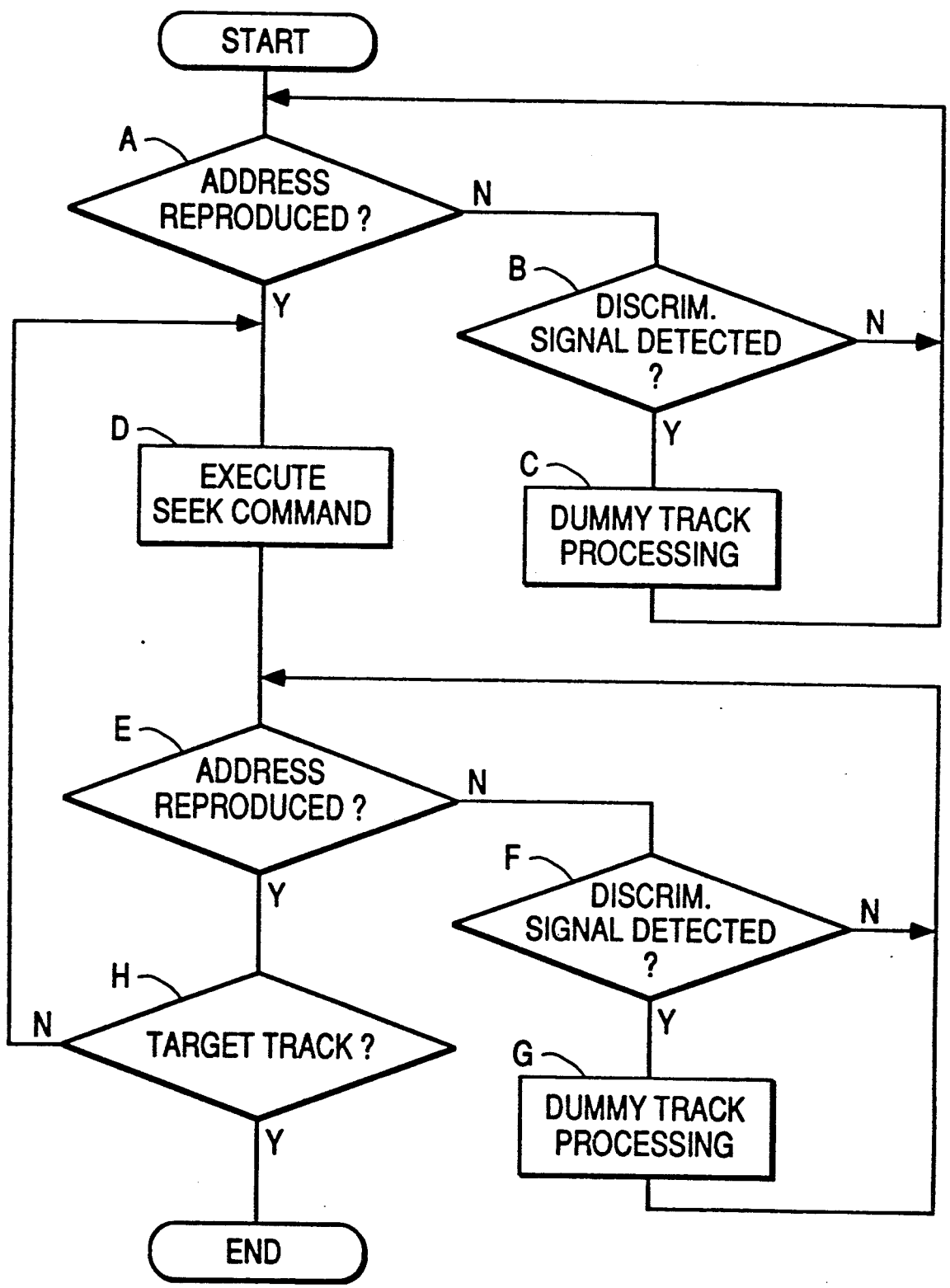
FIG. 6 is a flowchart to illustrate the seek operation.

Next, regarding the data reproduction operation from the information recording medium (not illustrated) which is loaded inside the optical disk drive unit 14, explanation is given by division between the seek operation and the data reproducing operation. Firstly, regarding the seek operation to the target track, explanation an is given below according to the flow chart of FIG. 6 while referring to the track construction shown in FIG. 2 and the block diagram of FIG. 5. It is assumed that the information recording medium has a dummy track area as explained with respect to FIG. 2, and the data reproducing operation is performed on the three sectors from the sector $S_n$ of the track (j) to the sector $S_1$ of the track (j+1) with a dummy track held therebetween.

Firstly, the microprocessor 11, when it receives a device command 113 from the host computer 17 which requires a data reproducing operation, it executes a seek operation toward the track (j) at which the first target sector in the data reproducing area is positioned. This seek operation is explained below according to the flowchart of FIG. 6.

(A) The address signal is discriminated and demodulated by the address detection circuit 13 from the reproduced signal 100 sent out by the optical disk drive unit 14. Microprocessor 11 reads out the address information 102 to get the address of the current track at which the head (not illustrated) in the optical disk drive unit 4 is positioned.

(B) When the address detection circuit 13 cannot read out the address information 102 within a certain time corresponding to the latency of one sector, the microprocessor 11 inspects the identification flag 114 which is to be sent out when the discrimination signal detection circuit 15 has detected the discrimination signal from the reproduced signal 100 to determine whether or not the head is on the dummy track or not. If the identification flag 114 shows non-detection state of the discrimination signal, then the microprocessor 11 judges the state to be the address reproduction fault and again tries the address reproduction operation of (A).

(C) The microprocessor 11, when it reads out the identification flag 114 which shows the detection state of the discrimination signal, it sends out to the optical disk drive unit 14 a seek command 115 in which the number of the dummy tracks has been given as a seek distance in order to move the head on the dummy track to the area outside the dummy track. The optical disk drive unit 14, when the execution of the seek command 115 has been completed, sends out the drive status 116 to the microprocessor 11.

(D) The microprocessor 11, on receipt of the address information 102 from the address detection circuit 13 in the operation of (A), calculates the logical seek distance given as the difference between the current track and the target track, and sends out the seek command 115 which has the seek distance as a parameter. The optical disk drive unit 14, on completion of execution of the seek command 115, sends out the drive status 116 to the microprocessor 11.

(E) On completion of the seek operation, the microprocessor 11 performs reading out of the current track address according to the same procedures as those of the operation (A).

(F) When the address detection circuit 13 cannot read out the address within a certain time corresponding to the latency of one sector, the microprocessor 11 determines whether or not the head is positioned on the dummy track according to the same procedures as those of the operation (B). If it is determined that the head is not on the dummy track, then the microprocessor 11 judges the address reproduction to be faulty and again tries the address reproducing operation (E).

(G) The microprocessor 11 executes the seek command 115 in order to move the head on the dummy track to an area outside the dummy track according to the same procedures as those of (C).

(H) The microprocessor 11 compares the address information 102 sent out from the address detection circuit 13 in the operation (E) with the target track address. When the read out address coincides with the target track address, the microprocessor 11 determines that the seek operation has been completed. Otherwise, in case of the non-coincidence, the microprocessor 11 carries out a retrying of the seek operation starting from the operation (D).

Through the above operations, the microprocessor 1 completes the seek operation with the track (j) set as the target track.

Figure 7:
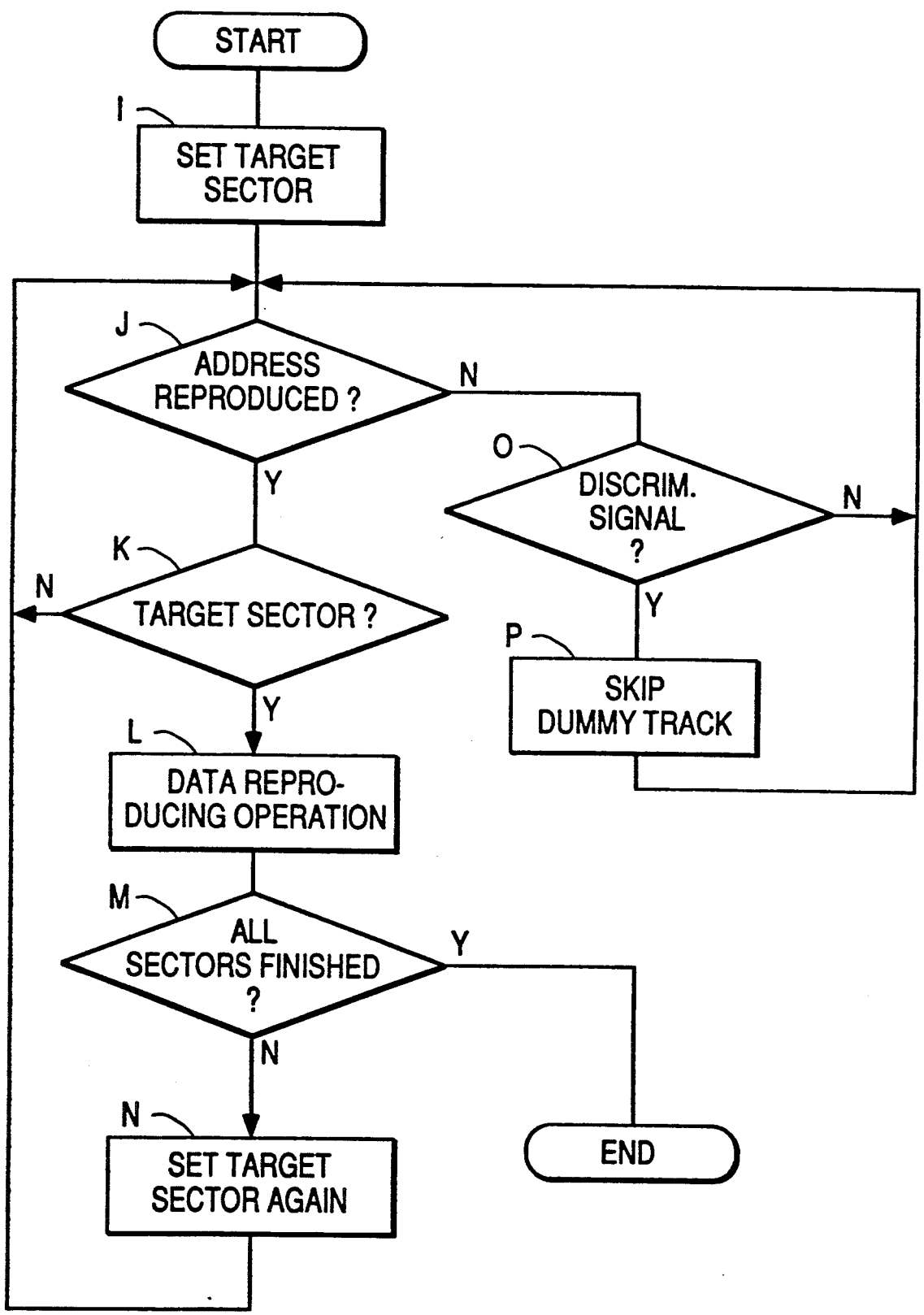
FIG. 7 is a flowchart to illustrate the data reproducing operation.

Next, referring to the track construction view of FIG. 1 and the block diagram of FIG. 5, in accordance with the flowchart of FIG. 7, an explanation is given below on the data reproducing operation covering the area from the sector $S_n$ of the track (j) to the sector $S_1$ of the track (j+1) with the dummy track held therebetween as a data reproducing area.

(I) The microprocessor 11 sets the address of the sector $S_n$ of the track (j) positioned at the first sector of the data reproducing area as the target sector address 109 to the address detection circuit 13.

(J) The address detection circuit 13 tries to read out the address information 102 which has been discriminated and demodulated from the reproduced signal 100 sent out from the optical disk drive unit 14.

(K) When the address information 102 is read out, the address detection circuit 13 compares it with the target sector address 109 set by the microprocessor 11 in the operation (I). If, in this comparison, non-coincidence is detected, the address detection circuit 13 returns to the operation (J) and waits for the time when the address is reproduced from the succeeding sector.

(L) The address detection circuit 13, on detection of the coincidence with the target sector address 109, sends out the start signal 117 to the data reproducing circuit 16 to start the data reproducing operation. The started data reproducing circuit 16 discriminates and demodulates the data signal recorded on the data field of the target sector from the reproduced signal 100, after which it performs an error correction procedure, and sends out the reproduced information 110 to the host computer 17. Also, the data reproducing circuit 16 sends out a read busy signal 118 which shows the data reproduction in progress to the microprocessor 11. The microprocessor 11 detects the completion of the data reproduction operation in the target sector by detecting the clearing of the read busy signal 118.

(M) The microprocessor 11 determines whether or not the target sector which has completed the data reproduction operation is the final sector in the data reproduction area designated by a device command 113, i.e., the sector $S_1$ of the track (j+1). In this case, if the target sector is the final sector, the microprocessor 11 transfers the command status 119 to the host computer 17 and notifies it of completion of the device command 113.

(N) When the target sector which has completed the data reproduction operation is not the final sector in the data reproduction area, the microprocessor 11 sends out the address of the sector following the current target sector as a new target sector address 109 to the address detection circuit 13 to perform re-setting of the target sector.

(O) When the address detection circuit 13 fails to read out the address information 102 within a certain time corresponding to the latency of one sector, the microprocessor 11 inspects the identification flag 114 which is sent out when the discrimination signal detection circuit 15 detects the discrimination signal from the reproduced signal 100 and determines whether or not the head is on the dummy track. If the identification flag 114 shows the non-detection state of the discrimination signal, the microprocessor 11 determines it to be an address reproduction fault and again tries the address reproduction operation of (J).

(P) The microprocessor 11, on detection of the identification flag 114 which shows the discrimination signal detection state, executes the seek command by the same procedures as those of (C) in order to move the head on the dummy track to the area outside the dummy track. Such a condition is produced in the case where, when, for example, the data reproduction operation of the sector $S_n$ of the track (j) is completed and the sector $S_0$ of the track (J+1) is set as a new target sector, there exists a dummy track between these sectors.

Up to this stage, explanation has been given on the data reproduction operation of the drive control section. Against this, in the data recording operation, the following operation is executed in place of the operation of (L). The address detection circuit 13, on detection of the target sector, sends out a starting signal 117 to the data recording circuit 18 to start the data recording operation. The started data recording circuit 18 adds the error correction code to the recording information 111 sent out by the host computer 17 and modulates it, and sends out the recording signal 112 to the optical disk drive unit 14, and records it on the data field of the target sector. Also, the data recording circuit 18 sends out a write busy signal 120 which shows the state of the data being recorded to the microprocessor 11. The microprocessor 11 detects that the write busy signal 120 is cleared to detect the completion of the data recording operation in the target sector.

From the abovementioned operations, the microprocessor 11 completes the data reproducing operation or the data recording operation with the dummy track held. In the foregoing explanations on the operations (C), (G) and (P), it is assumed that the microprocessor 11 causes the movement of the head outside the dummy track by the execution of the seek command 115. However, in the information recording medium having a spiral track, it is possible to move the head outside the dummy track without executing the seek command 115. In other words, the movement of the head outside the dummy track can be achieved by the fact that the head holds the trace operation of the dummy track within a time in which the number of rotations of the information recording medium is the same as the number of dummy tracks, or until the discrimination signal detection circuit 15 stops sending out the identification flag 114 which shows the detection of the discrimination signal.

To this stage, the operation has been explained on the information recording medium in which the dummy track area as shown in FIG. 2 is formed. On the other hand, in the information recording medium in which the dummy track area as shown in FIG. 3 is formed, there is an ID field in which an address information incorporated with an address flag for identifying the dummy track is recorded. Accordingly, there are two methods for identifying whether or not the head 2 is on the dummy track, one method detects the discrimination signal as stated in the operation (B), and another method inspects the address flag recorded in the ID field. In the information recording and reproducing apparatus using such an information recording medium, in order to identify the dummy track according to the second method, the microprocessor 11 performs the following operation in the above operation (A). When the address information 102 read out by the address reproducing circuit 13 is transferred, the microprocessor 11 inspects the address flag included therein, and, when it is identified to be the address information reproduced from the ID field on the dummy track, the microprocessor 11 executes the dummy track processing as explained in the operation (C). Such processing is executed in the similar manner to those in the operation (E). Also, in the data reproducing operation as explained in accordance with the flowchart of FIG. 7, the microprocessor 11 sets the address incorporated with the address flag which is meant to be the sector outside the dummy track area to the address detection circuit 13 as a target sector address 109. And, on coincidence of both the address information and the address flag, the address detection circuit 13 sends out the start signal 117 to the data reproducing circuit 16.

As explained above, according to this embodiment, by providing a means of detecting the discrimination signal recorded on the dummy track and a means of moving the head on the dummy track to a place in the zone, and detecting the discrimination signal reproduced when the head is positioned in the dummy track to move the head outside the dummy track area, the recording and reproducing operation of the erroneous data in the dummy track is prevented.

Figure 8:
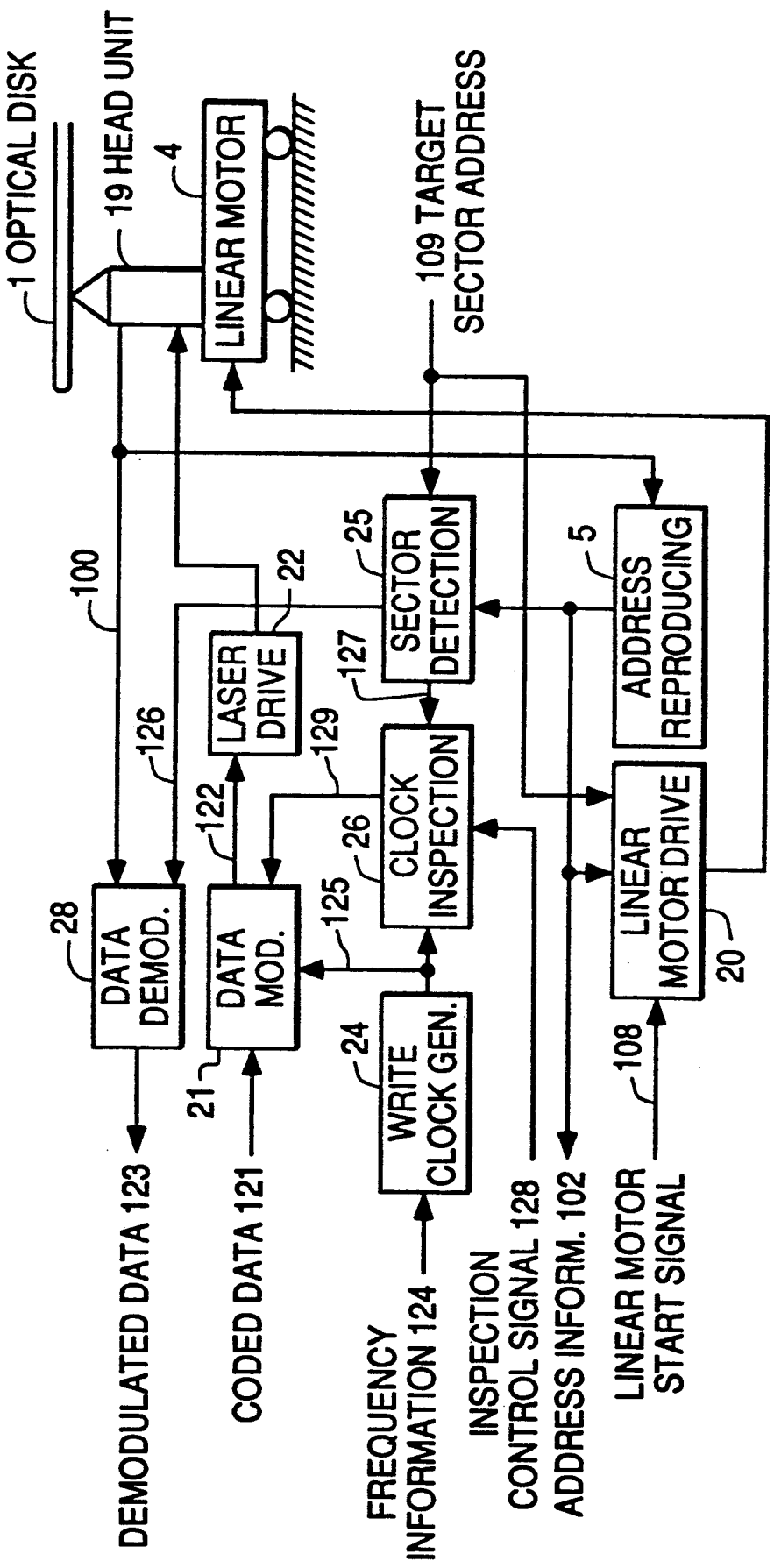
FIG. 8 is a block diagram of a data recording and reproducing section in an information recording and reproducing apparatus in accordance with one embodiment of the present invention.

In the information recording medium using an MCAV format, because of the difference between zones of the sector lengths given on the time axis, it becomes necessary to generate the write clock corresponding to the zone in which the data recording area is included. Next, the control operation of the write clock in the data recording operation is explained below. FIG. 8 is a block diagram showing one example of the construction of the data recording and reproducing section in the information recording and reproducing apparatus of the present invention. In FIG. 8, element 1 signifies an optical disk which is an information recording medium using an MCAV format; element 19 is a head unit for recording the signal by converging a laser beam on the track of the optical disk 1 and for detecting a signal from the optical disk 1 and amplifying said signal to produce a reproduced signal 100; element 4 is a linear motor for transferring the head unit 19 to the prescribed track; element 5 is an address reproducing circuit for discriminating and demodulating the address signal which is included in the reproduced signal 100 and for detected from the ID field of each sector to produce the address information 102; element 20 is a linear motor drive unit for computing the seek distance from the target sector address 109 to drive the linear motor 4 and for controlling the operation of the linear motor 4 based on the reproduced address information 102; element 21 is a data modulating circuit for modulating the coded data 121 using (2-7) RLLC and the like; element 22 is a laser drive circuit for modulating the intensity of the laser beam of the head unit 19 based on the data modulation signal 122; element 23 is a data demodulating circuit for discriminating and demodulating the data signal recorded on the data field from the reproduced signal 100 to produce the demodulated data 123; element 24 is a write clock generation circuit for generating a write clock 125 having a frequency corresponding to a frequency information 124 which is inherent to the zone, being constituted by a synthesizer system using a PLL (Phase-Locked Loop) or a plurality of quartz oscillators. Element 25 is a sector detection circuit for generating a read gate signal 126 or a write gate control signal 127 for controlling the timing of the data recording and reproducing operation by detecting the coincidence between the target sector address 109 and the address information 102; and element 26 is a clock inspection circuit which inspects the write clock 125 in coordination with the inspection control signal 128, and if the write clock is normal, sends out the write gate control signal 127 as a write gate signal 129.

Regarding the data recording and reproducing section of this embodiment constituted as above, the operation is explained below. Here, it is assumed that, by the seek operation as explained with reference to FIG. 4, the head unit 19 is already on the target track designated by the target sector address 109. Firstly, a target sector address 109 is set on the sector detection circuit 25. Next, the write clock generation circuit 24 generates the write clock 125 corresponding to the zone in which the target sector is positioned based on the frequency information 124, and the write clock 125 is given to the data modulating circuit 21 and the clock inspection circuit 26. When the inspection control signal 128 is inputted, the clock inspection circuit 26 determines whether or not the write clock 125 has a frequency suited to the data recording in the zone. And, if the frequency of the write clock 125 is in a prescribed range, the clock inspection circuit 26 sends out the write gate control signal 127 which is sent from the sector detecting circuit 25 as a write gate signal 129 to start the data modulating operation. At this time, the data modulating circuit 21 modulates the coded data 121 by using the write clock 125, inputs it to the laser drive circuit 22 and records it on the data field of the target sector. On the other hand, unless the frequency of the write clock 125 is in the prescribed range, the clock inspection circuit 26 inhibits the write gate control signal 127 which is sent from the sector detection circuit 25 and does not output the write gate signal 129.

Figure 9:
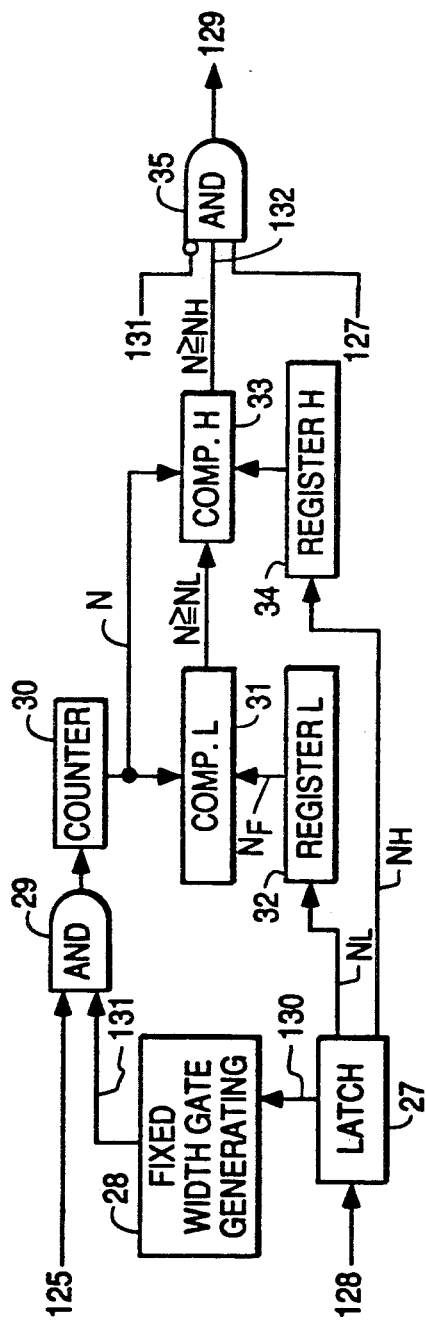
FIG. 9 is a construction view of a first embodiment relating to the clock inspection circuit.

Next, an explanation is given on the internal construction of the clock inspection circuit 26. FIG. 9 is a construction view of the first embodiment relating to the clock inspection circuit 26. In FIG. 9, element 27 is a latch circuit for producing the lower limit value $N_L$ and the upper limit value $N_H$ relating to the comparative value of the write clock and the inspection start signal 130 based on the inspection control signal 128; element 28 is a fixed width gate generating circuit for generating a fixed gate signal 131 having a certain time width; elements 29 and 35 are AND gates; element 30 is a counter for counting the write clock 125; elements 31 and 33 are comparators; elements 32 and 34 are registers for storing the lower limit value $N_L$ and the upper limit value $N_H$ relating to the comparative value, respectively.

The operation of the clock inspection circuit 26 constructed as above is explained. When the inspection control signal 128 is inputted, the latch circuit 27 sets the lower limit value $N_L$ and the upper limit value $N_H$ on the registers 32 and 34 for inspecting the counted value N by the counter 30, and outputs the inspection start signal 130 to the fixed width gate generating circuit 28. When the fixed width gate generating circuit 28 gives the fixed gate signal 131 having a certain time width to the AND gate 29, the write clock 125 which has passed through the AND gate 29 is counted by the counter 30. When the output of the fixed gate signal 131 from the fixed width gate generating circuit 28 is stopped and the count of the write clock 125 by the counter 30 is completed, if the count value N satisfies the conditions of $N_L \leq N \leq N_H$, the inspection output 132 becomes effective in view of the comparator 33. At this time, the write gate control signal 127 from the sector detecting circuit 25 passes through the AND gate 35 and is outputted as a write gate signal 129.

Figure 10:
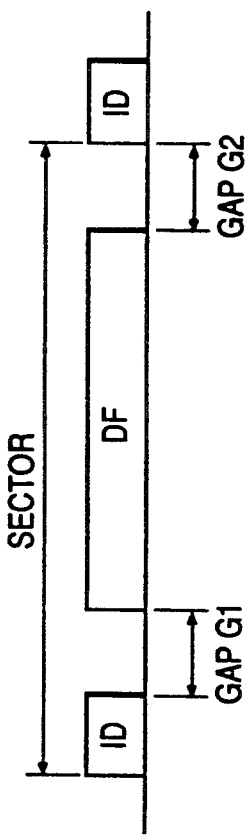
FIG. 10 is a schematic view of a sector format.

Next, a explanation is given on the relation between the write clock 125 and the sector format. FIG. 10 is an outline view of the sector format. In FIG. 10, the sector is composed of the ID field in which the address signal is recorded, the data field in which the modulated data is recorded, and the gaps G1 and G2. The gap G1 is an area corresponding to the time for the initial stabilizing of the laser power by the laser drive circuit 22, and the gap 2 is an area for absorbing the rotation fluctuation of the spindle motor and the like. Accordingly, it is necessary to set the frequency precision of the write clock 125 so that the data field is not enlarged beyond the gap G2. Further, it is necessary to set the frequency precision of the write clock 125 with due consideration paid to the eccentricity of disk, PLL oscillation precision, external shock, etc. in addition to the rotation fluctuation of the spindle motor.

Figure 11:
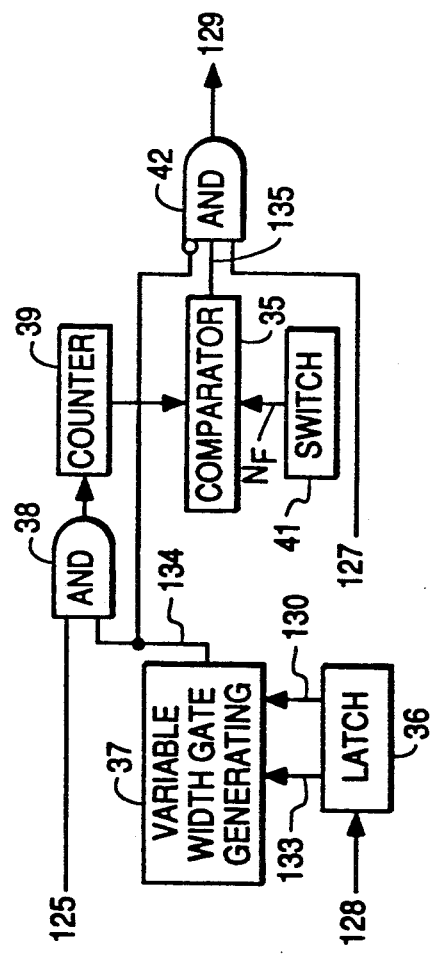
FIG. 11 is a construction view of a second embodiment relating to the clock inspection circuit.
Figure 12:
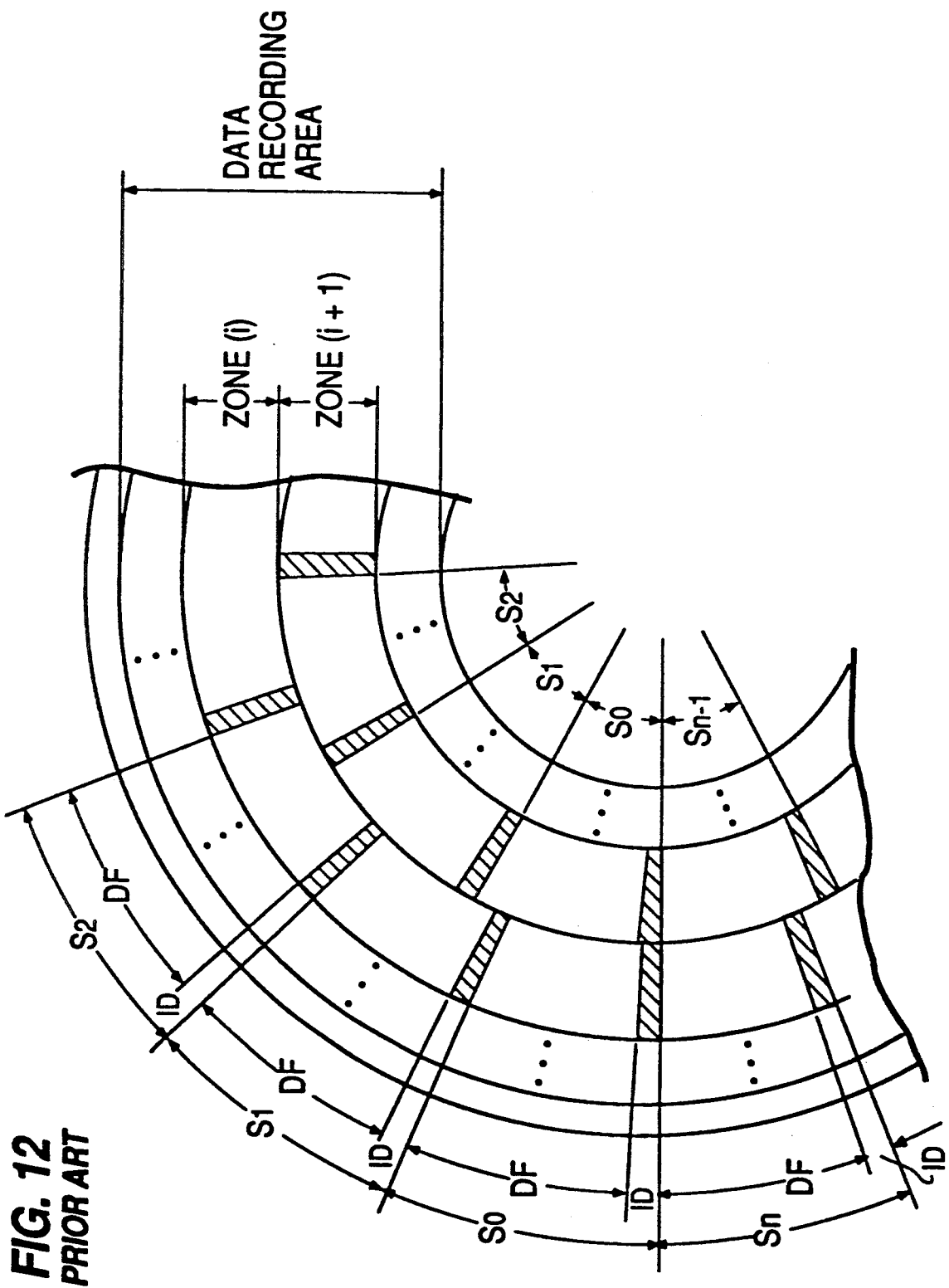
FIG. 12 is a schematic view of a conventional information recording medium.
Figure 13:
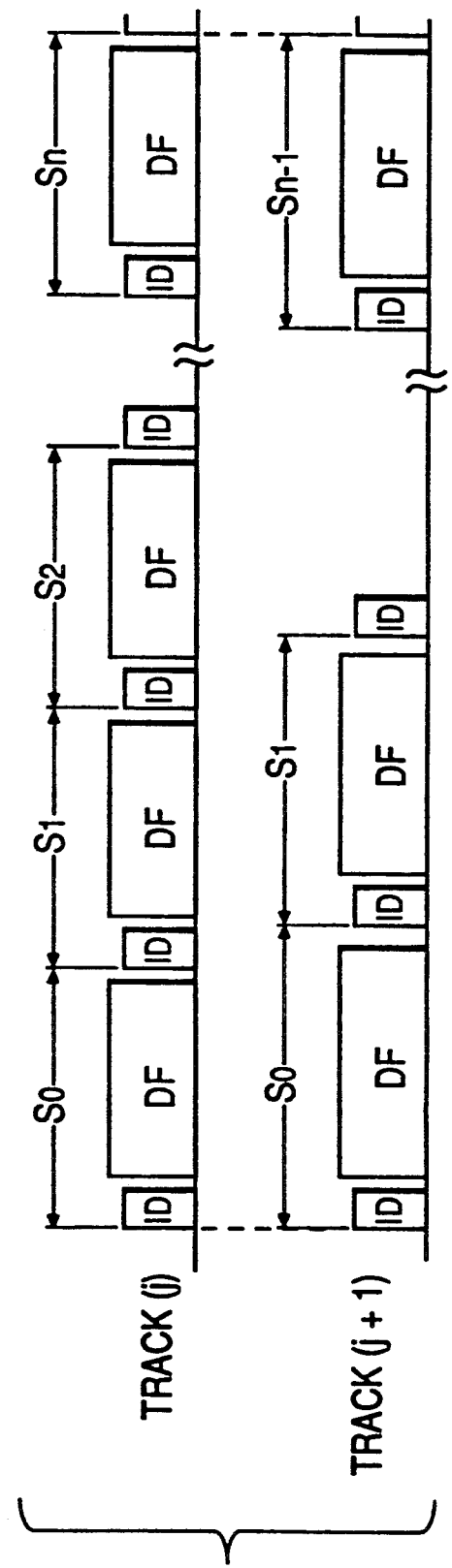
FIG. 13 is a track construction view of the conventional information recording medium.

Next, a explanation is given on the second embodiment relating to the internal structure of the clock inspection circuit 26. FIG. 11 is a construction view of the second embodiment relating to the clock inspection circuit. In FIG. 11, element 36 is a latch circuit for producing the inspection start signal 130 and the gate width 133 based on the inspection control signal 128; element 37 is a variable gate generating circuit for generating the variable width gate signal 134; elements 38 and 42 are both AND gates; element 39 is a counter for counting the write clock 125; element 40 is a comparator; and element 41 is a switch for setting the comparative value $N_F$, respectively.

Operation of the clock inspection circuit 26 constituted as above is explained. When the inspection control signal 128 is inputted, the latch circuit 36 outputs the gate width 133 for setting the time width for the counter 39 to count the write clock 125 and the inspection start signal 130 to the variable width gate generating circuit 37. When the variable width gate generating circuit 37 gives the variable width gate signal 134 whose width varies in reverse proportion to the write clock frequency to be used in the zone in which the target sector is positioned to the AND gate 38, the write clock 125 which has passed through the AND gate 38 is counted by the counter 39. When the output of the variable gate signal 134 from the variable width gate generating circuit 37 is stopped and the count of the write clock 125 by the counter 39 is terminated, if the count value N by the counter 30 satisfies the conditions of $N_F \leq N$, the comparative output 135 from the comparator 40 becomes effective. At this time, the write gate control signal 127 from the sector detection circuit 25 passes through the AND gate 42 and is outputted as a write gate signal 129.

By inspecting that the write clock 125 has the prescribed frequency precision using the two kinds of clock inspection circuits 26 as explained above, the destruction of the succeeding sector of the target sector by superposed recording and the recording of the signal in an excessive density is prevented, by which the reliability of the data can be improved.

What is claimed is:

1. An information recording and reproducing medium in which there is used a disk format such that a plurality of concentric or spiral tracks exist on the disk, the tracks being divided into plural zones with respect to the radial direction of the disk, with the same number of sectors being formed in each track in the zone, and that the number of the sectors per track increases as the zone goes toward the outer periphery, wherein in each sector an ID field in which an address information is recorded and a data field in which the data are to be recorded are formed, wherein data is recorded on a sector by sector basis, with a dummy track area composed of at least one dummy track on which a discrimination signal for identifying it to be a dummy track is recorded being formed on a boundery between the zones.

2. An information recording medium according to claim 1, wherein said dummy track is formed in the whole track zone.

3. An information recording medium according to claim 1, wherein said dummy track area is composed of at least two dummy tracks, in the dummy track which is positioned at the outermost periphery of the dummtrack area an ID field is formed on the same position as the track in the adjacent zone on the outer peripheral side, said discrimination signal being recorded on the data field of each sector, and in the dummy track which is positioned at the innermost periphery of the dummy track area an ID field is formed on the same position as the track in the adjacent zone on the inner peripheral side, said discrimination signal being recorded on the data field of each sector.

4. An information recording medium according to claim 1, wherein said discrimination signal has a different frequency band from that of address recording or data recording.

5. An information recording medium according to claim 1, wherein said discrimination signal has a unique pulse train which is unavailable in a modulation rule to be used for address recording or data recording.

6. An information recording and reproducing apparatus for recording and reproducing data by using a disk-shaped information recording medium in which there is used a disk format such that a plurality of concentric or spiral tracks on the disk are divided into plural zones with respect to the radial direction of the disk, with the same number of sectors being formed in each track in the zone, and that the number of the sectors per track increases as the zone goes toward the outer periphery, and a dummy track area composed of at least one dummy tack is formed on a boundary between the zones, said apparatus comprising:
  a seek distance calculating means for calculating a physical seek distance from a logical seek distance between a current track address and a target track address and the number of dummy tracks located between a current track and a target track;
  a head seeking means for moving the head to correspond to the physical seek distance;
  a seek distance counting means for counting the number of tracks over which the head has actually crossed; and
  a coincidence detection means for detecting a coincidence between a counting result by the seek distance counting means and the seek physical distance calculated by said seek distance calculating means, said head seeking means being stopped by an output of the coincidence detection means.

7. An information recording and reproducing apparatus for recording and reproducing data by using a disk-shaped information recording medium in which there is used a disk format such that a plurality of concentric or spiral tracks on the disk are divided into plural zones with respect to the radial direction of the disk, with the same number of sectors being formed in each track in the zone, and that the number of the sectors per track increases as the zone goes toward the outer periphery, and a dummy track area composed of at least one dummy track in which a discrimination signal for identifying it to be a dummy track is recorded is formed on a boundary between the zones, said apparatus comprising:

a discrimination signal detection means for detecting said discrimination signal reproduced from said dummy track; and a head moving means for moving a head located on said dummy track to a place inside the zone according to an output of the discrimination signal detection means.

8. An apparatus according to claim 7, wherein said head moving means moves the head to a place inside said zone by a seek distance corresponding to a number of dummy tracks given by a seek command.

9. An apparatus according to claim 7, wherein, when said discrimination signal is detected from an information recording medium on which a spiral track is formed, said head moving means moves the head to a place inside said zone by holding a condition for the head to trace the track within a time in which the number of rotations of said recording medium is the same as the number of dummy tracks.

10. An apparatus according to claim 7, wherein, when said discrimination signal is detected from an information recording medium on which a spiral track is formed, said head moving means moves the head to a place inside said zone by holding a condition for the head to trace the track until said discrimination signal is no longer detected.

11. An information recording and reproducing apparatus for recording and reproducing data by using a disk-shaped information recording medium in which a plurality of concentric or spiral tracks on the disk are divided into plural zones in the radial direction of the disk, in which zone each track is formed of the same number of sectors and a disk format such that the number of the sectors per track increases as the zone goes toward the outer periphery is used, said apparatus comprising:

a recording clock generating means for generating a write clock of a prescribed frequency corresponding to the zone in which data is recorded;

a write clock inspection means for inspecting the frequency of the write clock; and a data recoding means for modulating and recoding data on a sector by using the write clock; and said write clock inspection means for inspecting the frequency of the write clock to determine if the frequency of the write clock is in a predetermined allowable frequency precision in the zone for recording data, said write clock inspection means including a means for activating the data recording means only when the frequency of the write clock is in a predetermined allowable frequency precision in the zone for recording data.

12. An apparatus according to claim 11, wherein said clock inspection means comprises a gate signal generating means for generating a gate signal of a fixed width, a counter for counting the write clock, a comparison means for comparing an output of said counter, and a comparison value setting means for setting a comparison value to said comparison means, wherein a prescribed comparison value is given to said comparison value setting means in accordance with the zone for recording data to determine if the frequency of the write clock is within a prescribed allowable range.

13. An apparatus according to claim 11, wherein said clock inspection means comprises a variable gate signal generating means for generating a gate signal of variable width, a gate width setting means for setting a gate width to said gate signal generating means, a counter for counting the write clock, and a comparison means for comparing an output of said counter with a certain comparative value, wherein the prescribed gate width is changed by said variable gate signal generating means in accordance with the zone in which data is recorded to determine if the write clock is within a prescribed allowable range frequency.

* * * * *